United States Patent [19]

Charles et al.

[11] 3,849,200

[45] Nov. 19, 1974

[54] SEALED SODIUM-IODINE BATTERY

[75] Inventors: Richard J. Charles, Schenectady; Stephan P. Mitoff, Elnora, both of N.Y.

[73] Assignee: General Electric Company, Schenectady, N.Y.

[22] Filed: June 18, 1971

[21] Appl. No.: 154,550

[52] U.S. Cl. ............................................. 136/83 R
[51] Int. Cl. ........................................ H01m 13/00
[58] Field of Search ........ 136/83, 6, 20, 86 A, 86 F, 136/153, 146

[56] References Cited
UNITED STATES PATENTS

| | | | |
|---|---|---|---|
| 2,905,740 | 9/1959 | Smyth et al. | 136/83 R |
| 3,374,120 | 3/1968 | Lawson | 136/83 R |
| 3,404,036 | 10/1968 | Hummer et al. | 136/153 |
| 3,437,524 | 4/1969 | Hamby | 136/83 R |
| 3,476,602 | 11/1969 | Brown et al. | 136/83 R |
| 3,554,806 | 1/1971 | Greenberg et al. | 136/6 |
| 3,573,105 | 3/1971 | Weininger | 136/86 A |
| 3,582,404 | 6/1971 | Blackburne et al. | 136/83 R |
| 3,607,405 | 9/1971 | Christopher | 136/20 |
| 3,607,417 | 9/1971 | McRae | 136/146 |
| 3,642,538 | 2/1972 | Zito, Jr. | 136/6 |

FOREIGN PATENTS OR APPLICATIONS

| | | | |
|---|---|---|---|
| 23,101 | 12/1893 | Great Britain | 136/86 R |

*Primary Examiner*—Winston A. Douglas
*Assistant Examiner*—C. F. Lefevour
*Attorney, Agent, or Firm*—Paul R. Webb, II; Joseph T. Cohen; Jerome C. Squillaro

[57] ABSTRACT

A sealed sodium-iodine battery is disclosed which comprises a casing, a solid sodium anode positioned in the casing, a solid sodium ion-conductive electrolyte adjacent the anode and a solid iodine cathode positioned adjacent the opposite side of the electrolyte.

2 Claims, 1 Drawing Figure

PATENTED NOV 19 1974 3,849,200
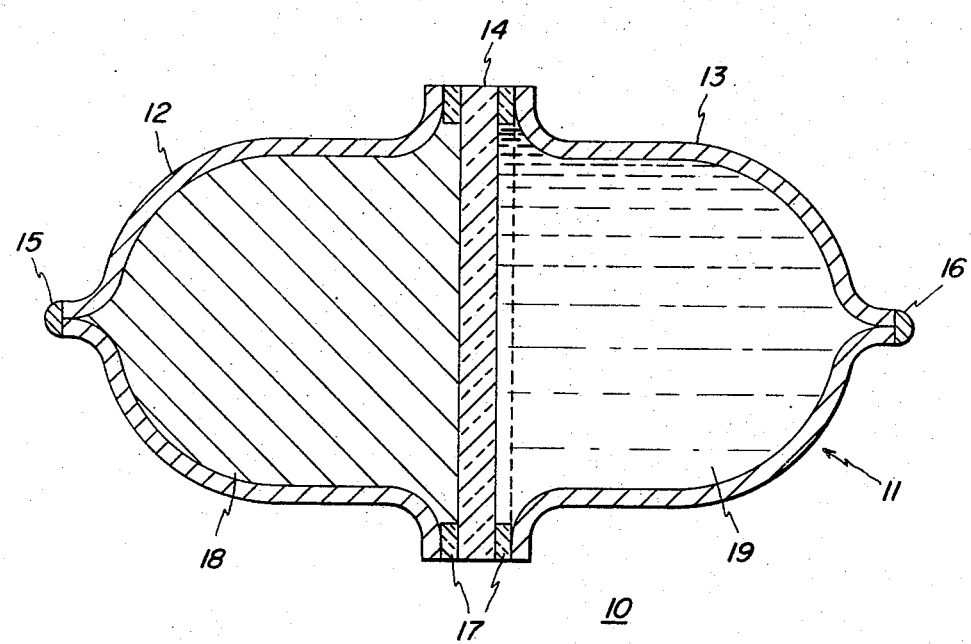
INVENTORS:
RICHARD J. CHARLES
STEPHAN P. MITOFF
by Paul R. Webb, II
THEIR ATTORNEY

SEALED SODIUM-IODINE BATTERY

This invention relates to sealed batteries and, more particularly, to primary or secondary batteries employing a solid sodium anode and a solid iodine cathode.

Sodium-sulfur cells, which operate at elevated temperatures above 300° C, are known in the prior art as, for example, described in Kummer et al. U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

Our present invention is directed to providing a sodium-iodine battery operable at lower operating temperatures of about 120° C as opposed to the above sodium-sulfur cells.

The primary object of our invention is to provide a battery which has a zero self-discharge rate, high cell voltage and high energy density.

In accordance with one aspect of our invention, a sealed sodium-iodine battery comprises a casing, a solid sodium anode positioned in the casing, a solid sodium ion-conductive electrolyte adjacent the anode, and a solid iodine cathode adjacent the opposite side of the electrolyte.

These and various other objects, features and advantages of the invention will be better understood from the following description taken in connection with the accompanying drawing in which:

The single FIGURE is a sectional view of a battery made in accordance with our invention.

In the single FIGURE of the drawing, there is shown generally at 10 a sealed sodium-iodine battery embodying our invention which has a metallic casing 11 including an anode casing portion 12 and a cathode casing portion 13 defined by a solid sodium ion-conductive electrolyte 14 positioned within casing 11. An electrical lead (not shown) is affixed to the respective casing portions. Closed fill tubes 15 and 16 are associated with the respective portions 12 and 13. Electrolyte 14 is secured on opposite sides to portions 12 and 13 by identical glass seals 17. Solid sodium 18 fills the anode casing portion 12 while solid iodine 19 fills the cathode casing portion 13. Conventional heating means (not shown) are provided to produce an operating temperature of about 120° C for the cathode and anode during battery operation.

We found that we could form a sealed sodium-iodine battery by providing a metallic casing with an anode portion and a cathode portion, providing a solid sodium ion-conductive electrolyte joining both portions thereto by glass seals, providing solid sodium in the anode portion, and providing solid iodine in the cathode portion. We found that such a battery has an open circuit voltage of 2.85 volts.

The anode casing portion can be nickel, Kovar alloy, niobium or tantalum while the cathode casing portion should preferably be niobium or tantalum. These metals have been shown to be chemically stable in their respective environments.

The lower operating temperature operation of about 120° C for the anode and cathode is attained by employing the respective anode and cathode materials of sodium and iodine. Iodine melts at 113°C while sodium melts at 98°C. Thus, the battery operates with liquid sodium and liquid iodine.

A unique method of hermetically sealing the anode and cathode portions of the casing to opposite sides of the solid electrolyte is disclosed and claimed in copending patent application entitled "Method of Forming a Metallic Battery Casing" in the name of Stephan P. Mitoff filed June 1, 1971 as Ser. No. 148,793. This copending application is assigned to the same assignee as the present application. We prefer this method wherein a disc of solid sodium ion-conductive electrolyte, for example, sodium beta-alumina, has stacked thereon a ring of General Electric Company 1013 glass cut from tubing. The glass ring has approximately the inside and outside diameter of the cup lip of casing portion. On the glass ring is stacked the nickel anode portion in cup form with its lip adjacent the ring. The three components are positioned on a supporting jig and lowered into an inert atmosphere furnace at 1,000° C for about 1 minute. The resulting seal is helium leak-tight. The process is repeated to seal the cathode portion to the opposite surface of the solid electrolyte. Both anode and cathode portions can also be sealed simultaneously to the disc in the above manner. An electronically conductive porous matrix, such as carbon felt or foam metal may be placed in the cathode portion before sealing.

We found the anode portion can be filled with sodium through tube 15 after which the tube is sealed, as for example, by welding. The cathode portion is filled with solid iodine through tube 16, after which the tube is similarly sealed. The resulting device is a sealed sodium-iodine battery operable at elevated temperatures of about 120° C which are lower than required for sodium-sulfur batteries of at least 300° C. Leads (not shown) are attached to the respective casing portions for operation of the battery. The battery can be employed as a primary or as a secondary battery.

Examples of sealed sodium-iodine batteries made in accordance with our invention are set forth below:

EXAMPLE I

A battery was assembled consisting of a beta-alumina tube which was sealed on one end to a glass tube and closed on the opposite end. The tube was filled with solid sodium and a fernico lead was in contact with the solid sodium and hermetically sealed into the glass tube. The sodium containing beta-alumina tube was immersed in a glass beaker containing iodine and carbon felt. A platinum lead was in contact with the felt and formed the positive pole of the sodium-iodine battery.

EXAMPLE 2

The battery of Example 1 showed an open circuit voltage of 2.85 volts. At a temperature of 120° C, this battery exhibited the following polarization behavior which is shown below in Table I.

TABLE I

| Current Amperes | Potential Volts |
|---|---|
| 0.0000 | 2.85 |
| 0.0004 | 2.8 |
| 0.0026 | 2.7 |
| 0.0110 | 2.6 |
| 0.0203 | 2.5 |
| 0.0295 | 2.4 |

TABLE I-Continued

| Current Amperes | Potential Volts |
|---|---|
| 0.046 | 2.2 |
| 0.071 | 2.0 |
| 0.095 | 1.8 |
| 0.110 | 1.6 |
| 0.12 | 1.4 |
| 0.126 | 1.2 |
| 0.135 | 1.0 |
| 0.142 | 0.8 |
| 0.148 | 0.6 |
| 0.157 | 0.4 |
| 0.158 | 0.2 |

EXAMPLE 3

A battery was assembled generally in accordance with the above description and with the single FIGURE of the drawing wherein a metallic casing having a nickel portion and a niobium portion was provided. Each casing portion was in the form of a cup with a lip and a tube extending from the closed surface. A solid sodium ion-conductive electrolyte was provided in the form of a disc of sodium beta-alumina. A glass ring with approximately the inside and outside diameter of the cup lip was cut from General Electric Company 1013 glass tubing. The electrolyte disc, glass ring and lip of the anode portion were stacked together on a jig which was lowered into an inert atmosphere furnace at 1,000° C for about 1 minute. The resulting seal was tested and found to be helium leak-tight. A similar glass ring and the lip of the cathode portion were positioned in that respective order on the opposite side of the electrolyte disc containing carbon felt which components were stacked together on a jig after which the structure was lowered into an inert atmosphere furnace at 1,000° C for about 1 minute. The second seal was found to be helium leak-tight.

The anode portion was then filled through its fill tube with molten sodium which solidified. The end of the fill tube was then sealed by welding. Iodine was added through the other fill tube to the cathode portion. This fill tube was then sealed at its end by welding. The resulting device was a sealed sodium-iodine battery.

While other modifications of the invention and variations thereof which may be employed within the scope of the invention have not been described, the invention is intended to include such as may be embraced within the following claims.

What we claim as new and desire to secure by Letters Patent of the United States is:

1. A sealed sodium-iodine battery operable at a temperature of approximately 120° C consisting of a casing, a liquid sodium anode positioned in the casing, a solid sodium beta-alumina ion-conductive electrolyte adjacent the anode, and a liquid iodine cathode positioned adjacent the opposite side of the electrolyte.

2. In a sealed sodium-iodine battery as in claim 1, in which the casing has an anode portion and a cathode portion, the anode portion consisting of a metal selected from the class consisting of nickel, Kovar alloy, niobium and tantalum, and the cathode portion consisting of a metal selected from the class consisting of niobium and tantalum.

* * * * *